United States Patent
Pisseloup

(10) Patent No.: US 8,887,869 B2
(45) Date of Patent: Nov. 18, 2014

(54) GAS TURBINE OIL SUPPLY SYSTEM AND METHOD FOR THE OPERATION OF A BEARING OIL SUPPLY SYSTEM FOR A GAS TURBINE

(75) Inventor: Arnaud Pisseloup, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1164 days.

(21) Appl. No.: 12/314,328

(22) Filed: Dec. 8, 2008

(65) Prior Publication Data

US 2010/0012434 A1    Jan. 21, 2010

(30) Foreign Application Priority Data

Dec. 7, 2007    (DE) .......................... 10 2007 058 954

(51) Int. Cl.
| | |
|---|---|
| *F01D 25/18* | (2006.01) |
| *F02C 7/06* | (2006.01) |
| *F01M 5/02* | (2006.01) |
| *B42D 15/00* | (2006.01) |

(52) U.S. Cl.
CPC ............ *F01D 25/18* (2013.01); *B42D 2037/02* (2013.01); *F02C 7/06* (2013.01); *F01M 5/021* (2013.01); *B42D 15/00* (2013.01)
USPC ........................................................ 184/6.11

(58) Field of Classification Search
CPC ........ F01D 25/18; F01D 25/20; F01M 5/001; F16N 7/40; F16N 2210/02
USPC ......................................... 184/6.11; 60/39.08
See application file for complete search history.

(56) References Cited

U.S. PATENT DOCUMENTS

| | | | |
|---|---|---|---|
| 2,402,467 A | 6/1946 | Thompson | |
| 3,451,214 A * | 6/1969 | Bradley | .......................... 60/788 |
| 3,626,693 A | 12/1971 | Guillot | |
| 3,769,790 A * | 11/1973 | Thebert | ........................ 60/39.08 |
| 4,284,174 A | 8/1981 | Salvana et al. | |

(Continued)

FOREIGN PATENT DOCUMENTS

| | | |
|---|---|---|
| DE | 1958813 | 6/1970 |
| DE | 2940643 | 4/1981 |

(Continued)

OTHER PUBLICATIONS

German Search Report dated Nov. 22, 2010 from counterpart application.

(Continued)

*Primary Examiner* — Henry Liu
(74) *Attorney, Agent, or Firm* — Timothy J. Klima; Shuttleworth & Ingersoll, PLC

(57) ABSTRACT

A gas turbine oil supply system and a method for the operation of a bearing oil supply system for a gas turbine includes an oil tank 1 and a supply line 2 branching off from the oil tank 1. An electric oil pump 3 is arranged in the supply line 2. A first controllable valve 4, by which the oil flow can be recirculated into the oil tank 1 via a return line 5, is arranged downstream of the oil pump 3. If a temperature of the oil is below a predetermined value prior to turbine start-up, the oil is diverted from supplying the bearings and recirculated through the tank to heat the oil to a desired level.

12 Claims, 2 Drawing Sheets

(56) References Cited

U.S. PATENT DOCUMENTS

Figure 1:
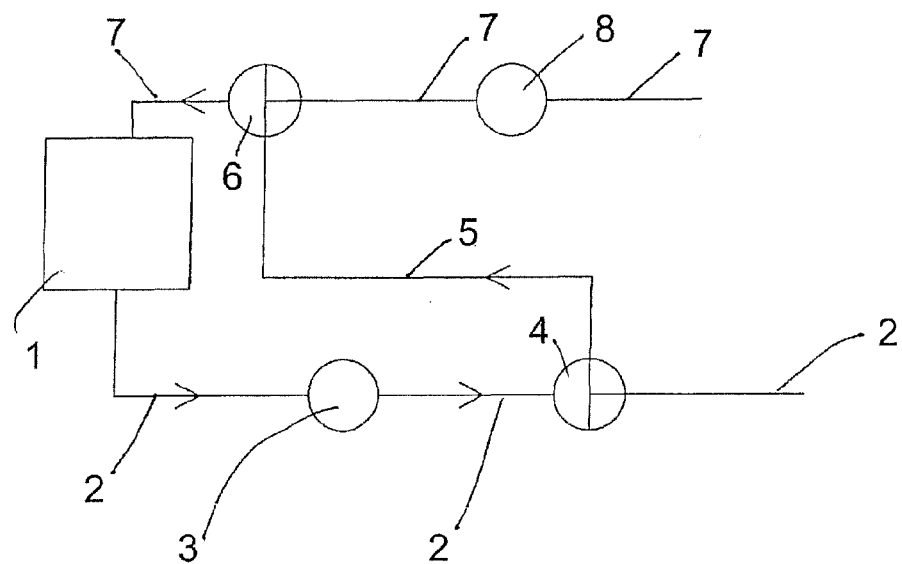

| | | | |
|---|---|---|---|
| 4,370,956 A | | 2/1983 | Moser et al. |
| 4,441,311 A | | 4/1984 | Rotondo et al. |
| 4,511,016 A | * | 4/1985 | Doell .......................... 184/6.11 |
| 4,940,114 A | * | 7/1990 | Albrecht ........................ 184/6.3 |
| 5,253,470 A | * | 10/1993 | Newton ........................ 60/39.08 |
| 2007/0169997 A1 | | 7/2007 | Delaloye |
| 2008/0217105 A1 | | 9/2008 | Streifinger |

FOREIGN PATENT DOCUMENTS

| | | |
|---|---|---|
| DE | 3015650 | 11/1981 |
| DE | 3605619 | 8/1987 |
| DE | 4304482 | 8/1994 |
| DE | 102005031804 | 1/2007 |
| DE | 102006023580 | 11/2007 |
| EP | 1561908 | 8/2005 |
| EP | 1820944 | 8/2007 |
| EP | 1847698 | 10/2007 |
| FR | 2358615 | 2/1978 |
| GB | 509238 | 7/1939 |
| JP | 62 176599 | 11/1987 |

OTHER PUBLICATIONS

European Search Report dated Oct. 1, 2010 from counterpart application.
Pisseloup—U.S. Appl. No. 12/379,378, filed Feb. 19, 2009.
European Search Report dated May 3, 2011 from related European application.
German Search Report dated Apr. 22, 2009 from related German application.

* cited by examiner

GAS TURBINE OIL SUPPLY SYSTEM AND METHOD FOR THE OPERATION OF A BEARING OIL SUPPLY SYSTEM FOR A GAS TURBINE

This application claims priority to German Patent Application DE 10 2007 058 954.0 filed Dec. 7, 2007, the entirety of which is incorporated by reference herein.

The present invention relates to a gas turbine oil supply system and a method for the operation of a bearing oil supply system for a gas turbine.

From the state of the art, oil supply systems are known in which bearing oil for the turbine rotor is pumped from an oil tank to the bearings by a mechanical pump. The mechanical pump is usually flanged to the gearbox and driven via one of the shafts of the gas turbine, mostly the high-speed shaft.

It is further known to provide the supply elements and the scavenge elements in one pump unit. This means that both the oil supply and the oil scavenge elements are driven by the same drive shaft and operated at the same time.

Under cold operating conditions, in particular if the oil temperature is below a specified value, for example −54° C., it is not recommendable to start the gas turbine. At oil temperatures above this specified temperature value, but below a second limiting value (for example −40° C.), it is recommended to run the gas turbine at idle for at least five minutes before accelerating to maximum power. During this time, it must be ensured that the oil reaches a sufficiently high temperature in the positive range, for example +10° C.

Such extreme conditions with cold oil occur, for example, on the ground in cold weather when the gas turbine was at rest over night or over a prolonged period of time or was windmilled.

The solutions known from the state of the art require heating of the oil prior to starting the gas turbine, either by an internal heater in the oil tank or by an external equipment transferring heat into the oil tank. These solutions are difficult to install and require external airport facilities which may not always be available and must additionally be transported by the aircraft if landing at remote sites is required, for example in military use.

Furthermore, the operating instructions require the pilot to considerably descend to a flight altitude that allows restarting of a gas turbine that was windmilled over a prolonged period of time and whose oil temperature, therefore, had fallen below a limit value which prohibits its restart.

Furthermore, the operating instructions state that, even with an oil temperature above −40° C., acceleration of the gas turbine beyond idle speed is not recommendable before the oil temperature has reached another limit value which is specified in the operating instructions and can depend on the type of the gas turbine.

Accordingly, it is disadvantageous that the known measures for heating the oil when the gas turbine is started or accelerated to maximum power require a change in the flight conditions, for example a descent to a lower altitude, or call for operation of the gas turbine with a specified maximum power over a specified time. This incurs considerable disadvantages, in particular in military applications where rapid starting is vital.

A change in the flight conditions, with the flight altitude being limited, is a severe handicap for the pilot in both military and civil use. Such restrictions are not possible, for example, in high terrain (mountains) or in view of the airspace structure.

In a broad aspect, the present invention provides a gas turbine oil supply system and a method for the operation of a bearing oil supply system for a gas turbine which, while avoiding the disadvantages of the state of the art, enables the oil to be effectively heated.

The present invention accordingly provides for the use of an electric oil pump. This electric oil pump is independent of the rotational speed of the shaft of the gas turbine and enables the oil to be repumped independently of the speed of the gas turbine. Accordingly, the electric oil pump can be operated independently of the gas turbine. Thus, the electric oil pump can also be put into operation when the gas turbine is at rest.

In accordance with the present invention, the electric oil pump is used for recirculating the oil pumped from the oil tank via the supply line and for pumping it into the oil tank. Damage to the oil pump due to highly viscous oil is, therefore, not to be feared as no further resistance is put up. In particular, other than in the state of the art, the cold oil is not initially pumped through the bearing chambers.

The design according to the present invention accordingly enables the oil to be preheated to permit the gas turbine to be quickly started and, consequently, reduce the time until take-off of the aircraft.

According to the present invention, electrical energy is only required to drive the electric oil pump. This electrical energy can be provided by an external electrical power supply or a simple electric power unit. The waste heat of the electrical oil pump further heats the oil, in addition to the heating resulting from the pressure being applied by the electrical oil pump itself.

The present invention is more fully described in light of the accompanying drawings showing a preferred embodiment. In the drawings, FIG. 1 is a schematic representation of a portion of the oil circuit according to the present invention in a cold operating condition, FIG. 2 is a representation analogically to FIG. 1 in the operating condition with sufficient oil temperature, and FIG. 3 is a schematic representation of an oil circuit in accordance with the state of the art.

Figure 2:
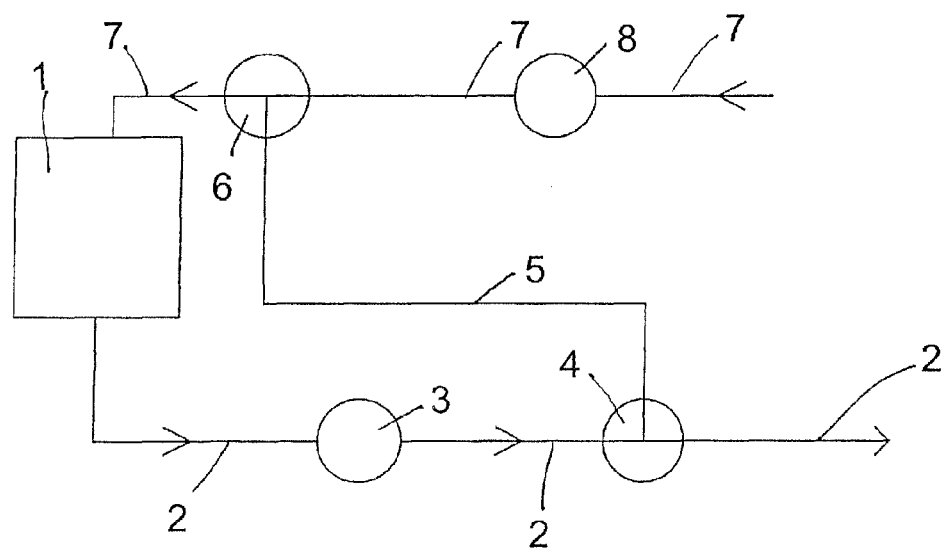
Figure 3:
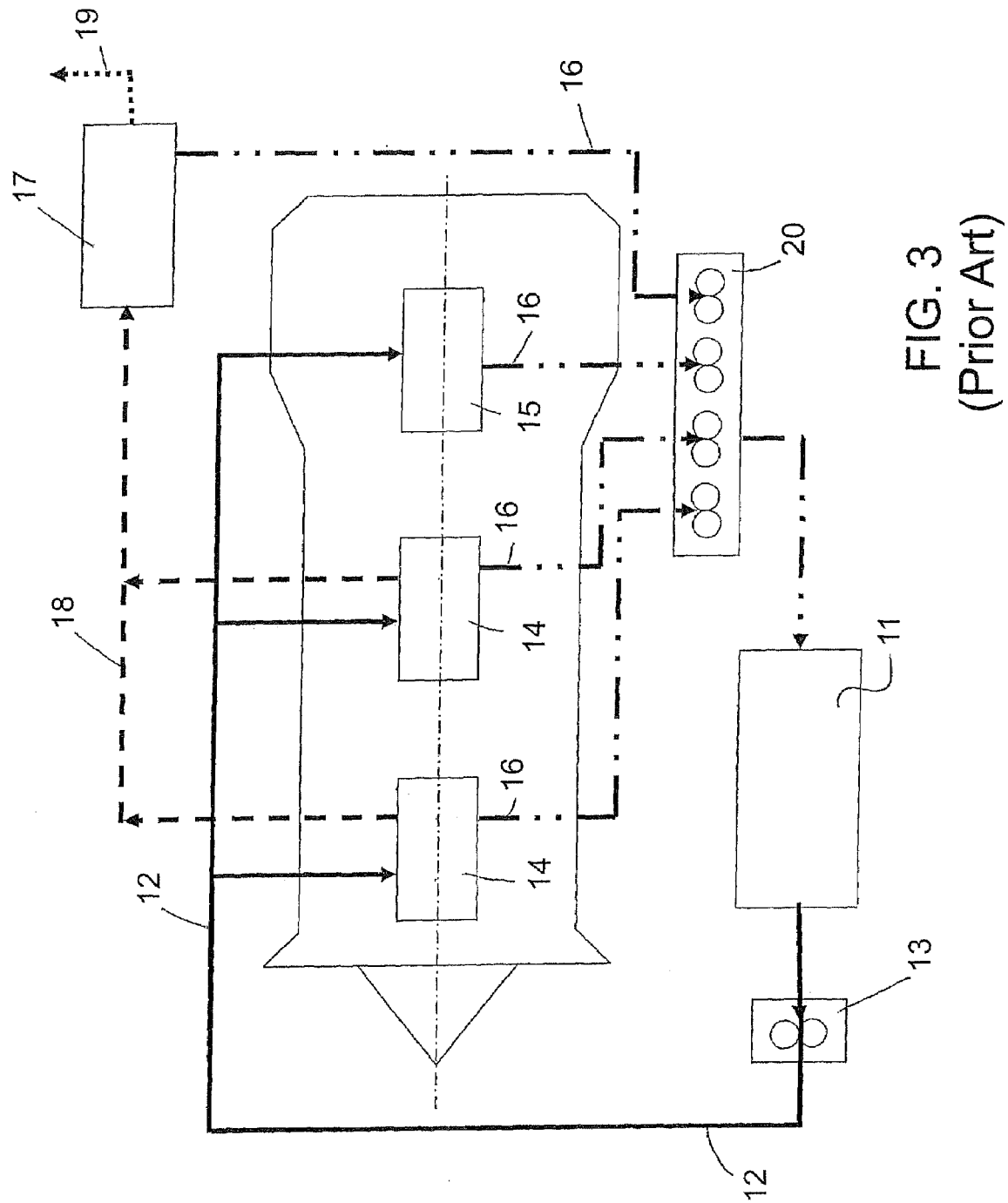

FIGS. 1 and 2 show an oil tank 1 from which a supply line 2 branches off to pump oil to bearing chambers not shown. An electric oil pump 3 is arranged in the oil supply line 2.

Downstream of the electric oil pump 3, a first branch element 4 (multiway valve) is arranged which is externally controllable. From the first branch element 4, a return line 5 branches off which leads to a second branch element 6 (multiway valve) which is arranged in a scavenge line from the bearing chambers to the oil tank 1. Reference numeral 8 indicates a scavenge pump 8 which is electrically or mechanically operable.

FIG. 1 shows a state (recirculation mode) in which the oil is below a specified value. Here, the oil flow pumped by the electrical oil pump 3 is switched by the first branch element 4 in such a manner that it is re-pumped via the return line 5 into the oil tank 1, with the second branch element 6 being also in the recirculation position.

The state shown in FIG. 1 accordingly applies prior to the start of the gas turbine. Here, no oil is supplied to the drive and bearing elements. Rather, the oil is merely recirculated to heat it.

Under very cold operating conditions, the inertia of the oil mass in the tank may prevent a quick rise in temperature and heat distribution by the electric oil pump. Under such extremely cold conditions, it may be favorable to integrate into, or allocate to, the electric oil pump 3 an additional electric heater which supplies and distributes heat via the electric oil pump. This reduces the time required for heating the oil to a specified temperature.

Upon reaching a specified value, the branch elements 4 and 6 switch into the operating position shown in FIG. 2. In this position, no oil is re-circulated through the return line 5, but the entire oil flow is fed via the supply line 2 to the bearing chambers or other oil consumers and returned via the scavenge line 7 (using the scavenge pump 8). In this process, the large oil volume held in the oil tank 1 significantly reduces the heat-up time of the remaining oil in the oil system and the bearing chambers as well as the other consumers.

Accordingly, a considerable reduction of the heat-up phase of the entire gas turbine proves to be advantageous.

It is further advantageous that no respective warning lamps have to be activated in the cockpit in order to prevent the pilot—as in the state of the art—from starting or accelerating the gas turbine with cold oil or high pressure loss across an oil filter.

The electric drive enables ground equipment to be dispensed with.

It is further advantageous that the solution according to the present invention is entirely independent of the rotational speed of the gas turbine shafts and, accordingly, can also be operated when the gas turbine is at rest and no oil flow to the bearings and other consumers is required.

The possibility to preheat the oil according to the present invention enables oil with adequate operating temperature to be supplied to the bearings and other consumers within a shortest time when the gas turbine is started. In particular, pressure losses as known from the state of the art are not encountered.

FIG. 3 shows an oil circuit according to the state of the art. Schematically shown is the outline of a gas turbine. It comprises vented bearing chambers 14 and a non-vented bearing chamber 15. The bearing chambers 14 and 15 are supplied with oil from an oil tank 11 via an oil supply line 12 in which an oil pump 13 is arranged. Via scavenge lines 16, the oil is returned to the tank 11 by a scavenge pump 20. Furthermore, vent lines 18 are connected to the bearing chambers 14 and 15 by which an oil-air mixture is fed to a breather 17. From the breather, the separated oil is fed via a scavenge line 16 to the scavenge pump 20, while air is discharged via an exhaust air line 19.

| List of reference numerals | |
|---|---|
| 1 | Oil tank |
| 2 | Supply line |
| 3 | Electric oil pump |
| 4 | First branch element (multiway valve) |
| 5 | Return line |
| 6 | Second branch element (multiway valve) |
| 7 | Scavenge line |
| 8 | Scavenge pump |
| 11 | Oil tank |
| 12 | Supply line |
| 13 | Oil pump |
| 14 | Vented bearing chamber |
| 15 | Non-vented bearing chamber |
| 16 | Scavenge line |
| 17 | Breather |
| 18 | Vent line |
| 19 | Exhaust air line |
| 20 | Scavenge pump |

What is claimed is:

1. A method for the operation of a bearing oil supply system for a gas turbine, comprising:
    providing an electric oil pump in a supply line connected to an oil tank;
    providing a first controllable valve downstream of the oil pump through which oil can be selectively directed to the bearings and to the oil tank via a return line;
    determining an oil temperature in the oil tank;
    comparing the determined oil temperature with a specified oil temperature at which the gas turbine can be safely started;
    when the determined oil temperature is below the specified oil temperature, placing the oil supply system in a recirculation mode by activating the electric oil pump and also activating the first controllable valve to simultaneously divert oil from the bearings while recirculating the oil into the oil tank via the return line;
    wherein, the electric oil pump is activated separately from rotation of the gas turbine such that the oil supply is recirculated while the gas turbine is not rotating;
    wherein the placing the oil supply system in a recirculation mode by activating the electric oil pump and also activating the first controllable valve to simultaneously divert oil from the bearings while recirculating the oil into the oil tank via the return line is performed prior to starting the gas turbine and while the gas turbine is not rotating,
    and also prior to starting the gas turbine and while the gas turbine is not rotating, recirculating the oil with the electric oil pump until the oil temperature has increased to the specified oil temperature.

2. The method of claim 1, wherein, in the recirculation mode, the first controllable valve is activated to completely divert all oil flow from the supply line to the return line.

3. The method of claim 2, and further comprising: when the specified oil temperature is reached or exceeded, exiting the recirculation mode by activating the first controllable valve to block flow of oil into the return line and to supply oil to the bearings.

4. The method of claim 3, and further comprising:
    providing a second controllable valve, by which the return line can be connected to a scavenge line from the bearings to recirculate the oil flow into the oil tank via the scavenge line; and
    activating both the first and second controllable valves together in the recirculation mode to recirculate the oil flow from the return line into the oil tank via the scavenge line.

5. The method of claim 1, and further comprising: when the specified oil temperature is reached or exceeded, exiting the recirculation mode by activating the first controllable valve to block flow of oil into the return line and to supply oil to the bearings.

6. The method of claim 3, and further comprising:
    providing a second controllable valve, by which the return line can be connected to a scavenge line from the bearings to recirculate the oil flow into the oil tank via the scavenge line; and
    activating both the first and second controllable valves together in the recirculation mode to recirculate the oil flow from the return line into the oil tank via the scavenge line.

7. The method of claim 6, wherein, in the recirculation mode, the first controllable valve is activated to completely divert all oil flow from the supply line to the return line.

8. The method of claim 1, and further comprising:
    providing a second controllable valve, by which the return line can be connected to a scavenge line from the bearings to recirculate the oil flow into the oil tank via the scavenge line; and activating both the first and second controllable valves together in the recirculation mode to recirculate the oil flow from the return line into the oil tank via the scavenge line.

9. The method of claim 8, wherein, in the recirculation mode, the first controllable valve is activated to completely divert all oil flow from the supply line to the return line.

10. The method of claim 9, and further comprising: actively heating the oil with a heat source in the recirculation mode.

11. The method of claim 7, and further comprising: actively heating the oil with a heat source in the recirculation mode.

12. The method of claim 1, and further comprising: actively heating the oil with a heat source in the recirculation mode.

\* \* \* \* \*